United States Patent
Machuca et al.

(10) Patent No.: US 7,919,209 B2
(45) Date of Patent: Apr. 5, 2011

(54) SYSTEM STABILITY AND PERFORMANCE IMPROVEMENT WITH ANODE HEAT EXCHANGER PLUMBING AND RE-CIRCULATION RATE

(75) Inventors: Joe C. Machuca, Rochester, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1008 days.

(21) Appl. No.: 11/676,438

(22) Filed: Feb. 19, 2007

(65) Prior Publication Data

US 2008/0199742 A1 Aug. 21, 2008

(51) Int. Cl.
*H01M 8/00* (2006.01)
(52) U.S. Cl. .................................. 429/400; 429/435
(58) Field of Classification Search .................. 429/435, 429/400
See application file for complete search history.

(56) References Cited

U.S. PATENT DOCUMENTS

| | | |
|---|---|---|
| 6,692,851 B2* | 2/2004 | Keskula et al. ............... 429/13 |
| 6,713,204 B2* | 3/2004 | Shimanuki et al. ........... 429/26 |
| 6,948,559 B2* | 9/2005 | Reinke et al. ............... 165/140 |

* cited by examiner

*Primary Examiner* — Melvin C Mayes
*Assistant Examiner* — Stefanie Cohen
(74) *Attorney, Agent, or Firm* — John A. Miller; Miller IP Group, PLC

(57) ABSTRACT

A fuel cell system that increases stack stability by reducing the amount of liquid water droplets at the anode input of a fuel cell stack in the system. Re-circulated anode exhaust gas from the fuel cell stack and fresh hydrogen gas are sent to an anode heat exchanger so that both the fresh hydrogen gas and the re-circulated anode exhaust gas are heated to reduce the formation of water droplets in the anode input gas. Further, a portion of the heated cooling fluid directly from the fuel cell stack is sent to the heat exchanger to heat the fresh hydrogen gas and the re-circulation hydrogen before the cooling fluid is sent to an isolation heat exchanger to have its temperature reduced.

12 Claims, 2 Drawing Sheets

SYSTEM STABILITY AND PERFORMANCE IMPROVEMENT WITH ANODE HEAT EXCHANGER PLUMBING AND RE-CIRCULATION RATE

BACKGROUND OF THE INVENTION

1. Field of the Invention

This invention relates generally to a fuel cell system that heats an anode re-circulation gas for preventing water droplets from forming to improve system stability and, more particularly, to a fuel cell system that uses a heated cooling fluid directly from the stack to heat an anode re-circulation gas for preventing water droplets from forming to improve system stability.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. An automotive fuel cell stack may include about four hundred fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

As is well understood in the art, the membranes within a fuel cell need to have a certain relative humidity so that the ionic resistance across the membrane is low enough to effectively conduct protons. During operation of the fuel cell stack, water by-product and external humidification may enter the anode and cathode flow channels. At low power demands, typically below 0.2 A/cm$^2$, the water may accumulate within the flow channels because the flow rate of the reactant gas is too low to force the water out of the channels. As the accumulation of water increases, the flow channel may close off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

In one known fuel cell design, anode exhaust gas is re-circulated back to the anode input so that un-reacted hydrogen in the exhaust gas can be reused. The anode exhaust gas from the stack is at an elevated temperature and is humidified as a result of the stack water by-product. Therefore, when the heated and humidified re-circulation anode exhaust gas is mixed with the fresh, dry and cool hydrogen at the anode input, the temperature differential causes the water vapor within the re-circulated anode exhaust gas to condense into liquid water droplets. The liquid water droplets then enter the anode reactant gas flow channels possibly causing cell stability problems as discussed above.

SUMMARY OF THE INVENTION

In accordance with the teachings of the present invention, a fuel cell system is disclosed that increases stack stability by reducing the amount of liquid water droplets at the anode input of a fuel cell stack in the system. Re-circulated anode exhaust gas from the fuel cell stack and fresh hydrogen gas are sent to an anode heat exchanger so that both the fresh hydrogen gas and the re-circulated anode exhaust gas are heated to reduce the formation of water droplets in the anode input gas. Further, a portion of the heated cooling fluid directly from the fuel cell stack is sent to the anode heat exchanger to heat the fresh hydrogen gas and the re-circulation hydrogen before the cooling fluid is sent to an isolation heat exchanger to have its temperature reduced.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that uses heated cooling fluid to heat the anode input gas is merely exemplary in nature, and is in no way intended to limit the invention or its applications or uses.

Figure 1:
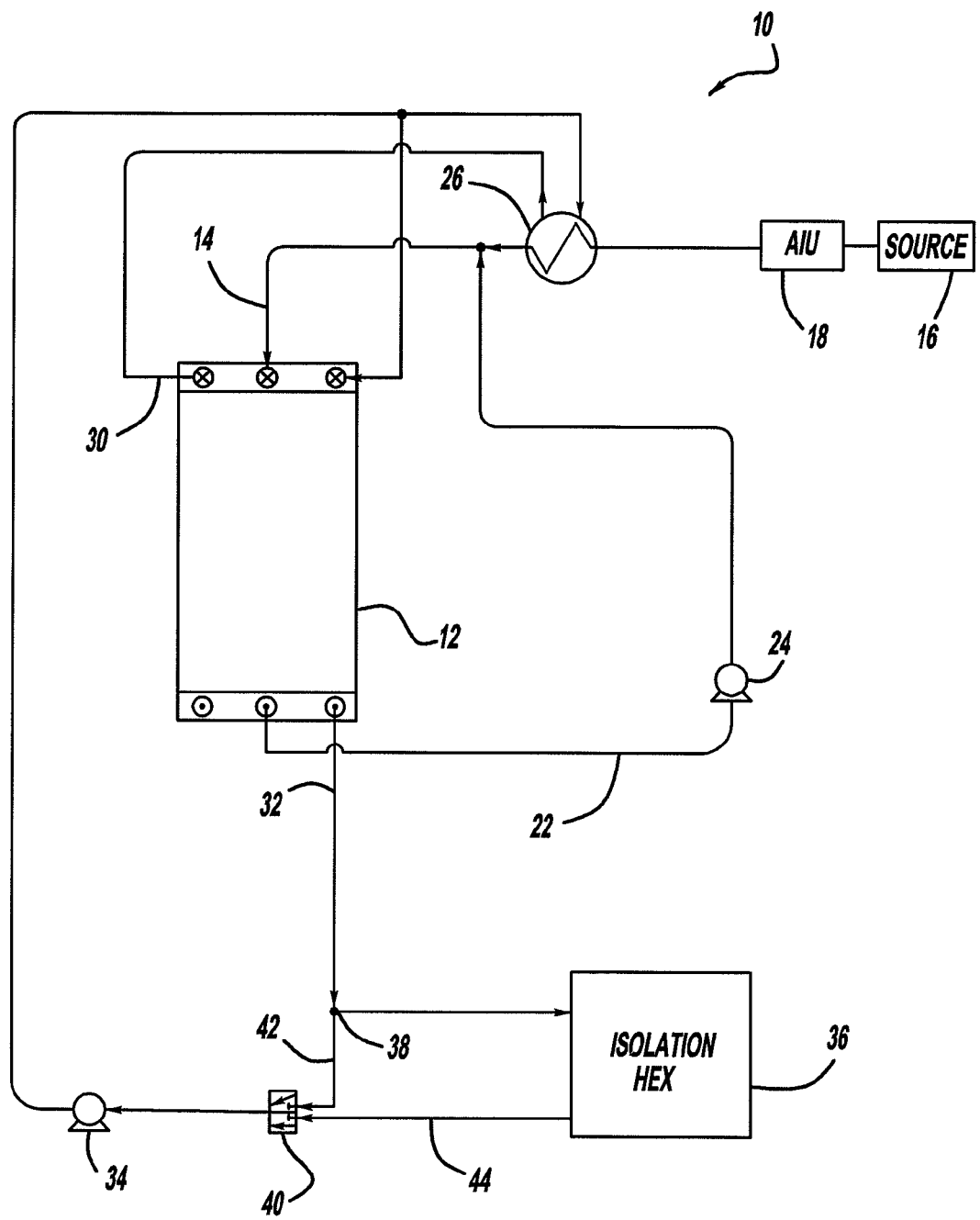
FIG. 1 is a schematic plan view of a known fuel cell system that employs anode re-circulation.

FIG. 1 is a schematic diagram of a known fuel cell system 10 of the type discussed above. The cathode side of the system 10 is not shown for clarity purposes. The fuel cell system 10 includes a fuel cell stack 12 that receives a hydrogen reactant gas flow on line 14 from a hydrogen source 16, such as a compressed gas tank. The hydrogen gas from the source 16 is sent to an anode inlet unit (AIU) 18 that injects the hydrogen gas into the fuel cell stack 12 at the desired flow rate and pressure. In this design, anode exhaust gas is output from the stack 12 on line 22 and is re-circulated back to the input line 14 by a pump 24 to reclaim the un-reacted hydrogen. The anode exhaust gas from the fuel cell stack 12 is heated and humidified as a result of the operating temperature of the stack 12 and the water by-product generated by the stack 12. The fresh hydrogen from the source 16 is dry and is at a cooler temperature. Therefore, an anode heat exchanger 26 is provided to heat the fresh hydrogen from the AIU 18 before it is mixed with the re-circulated anode exhaust gas so that when the heated re-circulated anode exhaust gas is mixed with the fresh hydrogen gas, they are near the same temperature. This helps prevent the water vapor within the re-circulated anode exhaust gas from condensing into water droplets.

A cooling fluid flow enters the stack 12 on line 30, and heated cooling fluid exits the stack 12 on line 32. The cooling fluid flow maintains the operating temperature of the stack 12 at a desirable temperature. A pump 34 pumps the cooling fluid through the coolant loop. An isolation heat exchanger 36, such as a suitable radiator, reduces the temperature of the cooling fluid exiting the stack 12 on the line 32 so that when it is sent back to the stack 12 on the line 30 its temperature is significantly lower. Depending on the operating conditions of the system 10, such as cold start-up, it may be desirable to by-pass the heat exchanger 36 so that the temperature of the stack 12 increases more rapidly to its operating temperature for performance purposes. Therefore, a junction 38 can be used to by-pass the heat exchanger 36. A by-pass valve 40 receives the cooling fluid directly from the stack 12 on line 42 and from the heat exchanger 36 on line 44. By selectively actuating the valve 40, a desirable portion of the cooling fluid will be directed through the heat exchanger 36 and by-pass the heat exchanger 36 through the junction 38.

The cooling fluid is used to heat the fresh hydrogen gas from the source 16 in the heat exchanger 26. Particularly, before the cooling fluid is directed to the input line 30, it is first sent to the heat exchanger 26 for this purpose. However, because the cooling fluid has already been reduced in temperature by the heat exchanger 36, less heat is available in the cooling fluid to prevent the formation of water droplets from the mixture of the anode exhaust recirculation gas and the fresh hydrogen gas as discussed above.

Figure 2:
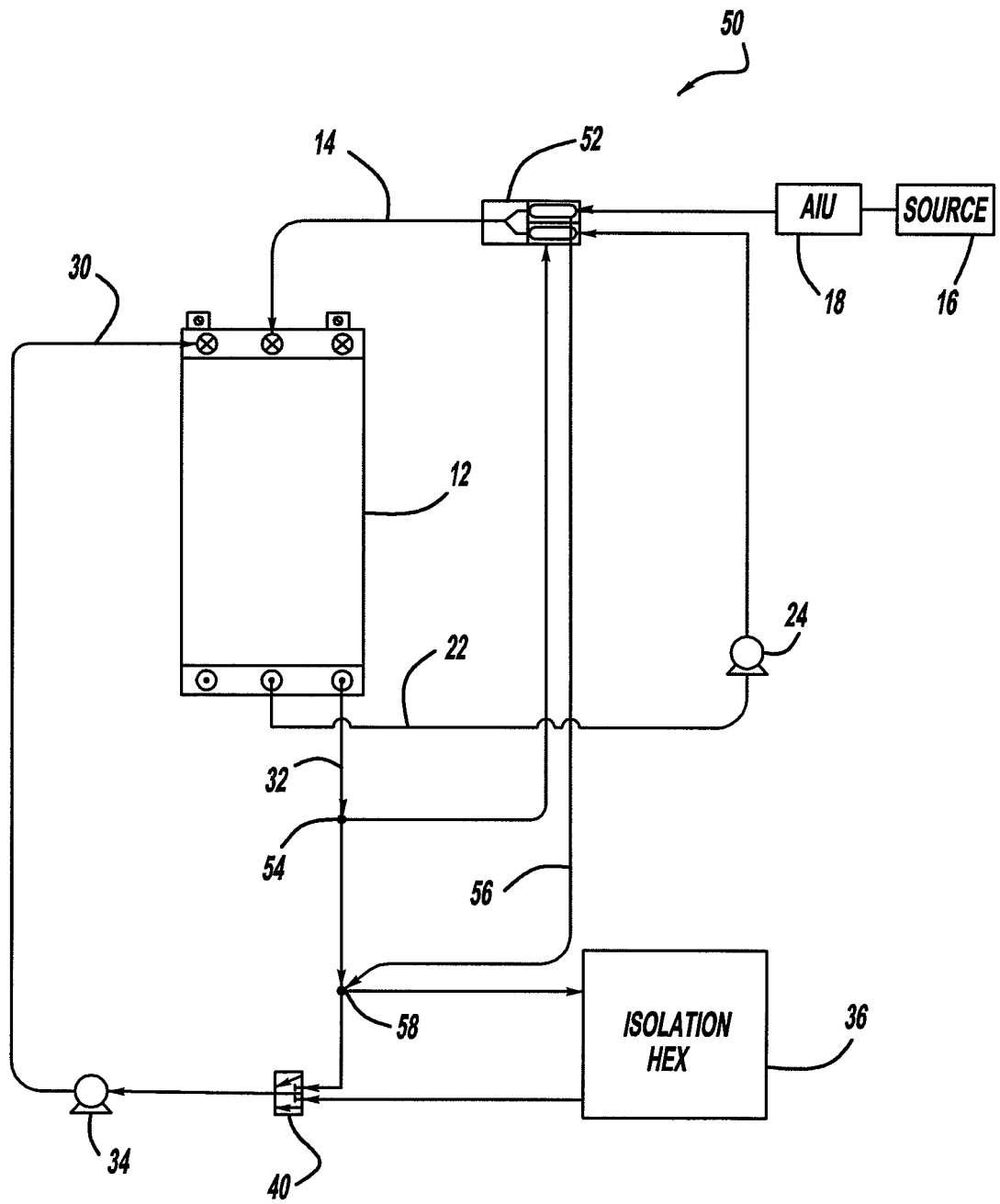
FIG. 2 is a schematic plan view of a fuel cell system that heats both fresh hydrogen gas and re-circulated anode exhaust gas at the anode input and uses heated cooling fluid to heat the fresh hydrogen gas and re-circulated anode exhaust gas, according to an embodiment of the present invention.

FIG. 2 is a schematic plan view of a fuel cell system 50, according to an embodiment of the present invention, where like elements to the fuel cell system 10 are identified by the same reference numeral. In this embodiment, the re-circulated anode exhaust gas on the line 22 is sent to an anode heat exchanger 52 so that it is also heated with the fresh hydrogen gas from the source 16. This increases the temperature of the re-circulated anode exhaust gas so that fewer water droplets are formed that may be input to the stack 12.

Further, a by-pass junction 54 is provided in the cooling fluid output line 32 to direct a portion of the heated cooling fluid directly from the stack 12 to the heat exchanger 52. In one embodiment, the heated cooling fluid is at the stack operating temperature, for example, 80° C. in one embodiment, the junction 54 is a fixed junction where the same amount of the heated cooling fluid is directed to the heat exchanger 36 or the anode heat exchanger 52. A return line 56 returns the cooling fluid from the heat exchanger 26 to a junction 58, similar to the junction 38, that combines it with the cooling fluid that is not directed to the anode heat exchanger 52. The combined cooling fluid is then either sent to the heat exchanger 36 or directly to the valve 40 in the same manner as discussed above. Therefore, the cooling fluid that is provided to the anode heat exchanger 52 is the heated cooling fluid directly from the stack 12, and is not the cooling fluid that has been reduced in temperature by the heat exchanger 36 as in the system 10. Thus, instead of the cooling fluid being at the reduced temperature in the anode heat exchanger 52, the cooling fluid is at or near the stack operating temperature so that more heat is available to reduce the formation of water droplets.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack;
an anode input line;
a hydrogen source providing fresh hydrogen gas to the anode input line;
an anode re-circulation line for re-circulating anode exhaust gas from the stack to the anode input line;
an anode heat exchanger receiving the re-circulated anode exhaust gas and the fresh hydrogen gas from the source, said anode heat exchanger heating both the re-circulated anode exhaust gas and the fresh hydrogen gas;
a cooling fluid line directing a cooling fluid through the stack, where heated cooling fluid exits the stack and cooled cooling fluid enters the stack from the cooling fluid line, said cooling fluid line directing at least a portion of the heated cooling fluid from the stack to the anode heat exchanger to heat the re-circulated anode exhaust gas and the fresh hydrogen gas; and
an isolation heat exchanger receiving the portion of the cooling fluid after the portion of the cooling fluid flows through the anode heat exchanger, said isolation heat exchanger cooling the cooling fluid.

2. The system according to claim 1 further comprising a by-pass valve, said by-pass valve being selectively controlled to allow the heated cooling fluid from the stack to by-pass the isolation heat exchanger.

3. The system according to claim 1 further comprising a junction, said junction directing a selected portion of the heated cooling fluid from the stack to the anode heat exchanger and a remaining portion of the heated cooling fluid to the isolation heat exchanger.

4. The system according to claim 1 wherein the fuel cell system is on a vehicle.

5. The system according to claim 1 wherein the temperature of the heated cooling fluid is about 80° C.

6. The system according to claim 1 wherein the isolation heat exchanger is a radiator.

7. A fuel cell system comprising:
a fuel cell stack;
an anode input line;
a hydrogen source providing fresh hydrogen gas to the anode input line;
an anode re-circulation line for re-circulating anode exhaust gas from the stack to the anode input line; and an anode heat exchanger receiving both the re-circulated anode exhaust gas and the fresh hydrogen gas, said anode heat exchanger heating the re-circulated anode exhaust gas and the fresh hydrogen gas in the anode heat exchanger before the re-circulation anode exhaust and the fresh hydrogen gas enter the fuel cell stack.

8. The system according to claim 7 further comprising a cooling fluid line for directing a cooling fluid through the stack, where the cooling fluid is directed through the anode heat exchanger to heat the fresh hydrogen gas and the re-circulated anode exhaust.

9. A method for reducing liquid water droplets in an anode inlet to a fuel cell stack, said method comprising:
   directing fresh hydrogen gas and re-circulated anode exhaust gas to an anode heat exchanger to heat both the fresh hydrogen gas and the re-circulated anode exhaust gas; and
   directing at least a portion of heated cooling fluid directly from the stack to the anode heat exchanger to heat both the fresh hydrogen gas and the re-circulated anode exhaust gas.

10. The method according to claim 9 further comprising directing the portion of heated cooling fluid from the anode heat exchanger to an isolation heat exchanger to cool the cooling fluid.

11. The method according to claim 10 further comprising selectively by-passing the heated cooling fluid from the stack around the isolation heat exchanger.

12. The method according to claim 11 further comprising directing a selected portion of the heated cooling fluid from the stack to the anode heat exchanger and a remaining portion of the heated cooling fluid to the isolation heat exchanger.

* * * * *